United States Patent
Mueller et al.

(10) Patent No.: US 10,127,281 B2
(45) Date of Patent: Nov. 13, 2018

(54) DYNAMIC HASH TABLE SIZE ESTIMATION DURING DATABASE AGGREGATION PROCESSING

(71) Applicant: SAP SE, Walldorf (DE)

(72) Inventors: Ingo Mueller, Frankfurt (DE); Arnaud Lacurie, Mannheim (DE)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 15/016,978

(22) Filed: Feb. 5, 2016

(65) Prior Publication Data

US 2017/0228373 A1    Aug. 10, 2017

(51) Int. Cl.
*G06F 17/30* (2006.01)
*G06F 12/0895* (2016.01)
*G06F 12/0864* (2016.01)
*G06F 12/02* (2006.01)
*G06F 12/1018* (2016.01)

(52) U.S. Cl.
CPC ........ *G06F 17/3048* (2013.01); *G06F 12/023* (2013.01); *G06F 12/0864* (2013.01); *G06F 12/0895* (2013.01); *G06F 12/1018* (2013.01); *G06F 17/3033* (2013.01); *G06F 17/30528* (2013.01); *G06F 17/30554* (2013.01); *G06F 17/30584* (2013.01); *G06F 2212/604* (2013.01)

(58) Field of Classification Search
CPC ......... G06F 17/30489; G06F 17/30339; G06F 17/30412; G06F 17/30949; G06F 12/0802

USPC .......................................... 707/737; 711/216
See application file for complete search history.

(56) References Cited

U.S. PATENT DOCUMENTS

| | | | |
|---|---|---|---|
| 6,182,061 B1 * | 1/2001 | Matsuzawa ....... | G06F 17/30489 707/737 |
| 2006/0116989 A1 * | 6/2006 | Bellamkonda, Sr. .......... | G06F 17/30489 |
| 2008/0215849 A1 * | 9/2008 | Scott ................ | G06F 17/30949 711/216 |
| 2011/0225391 A1 * | 9/2011 | Burroughs ............ | G06F 9/3851 711/216 |
| 2011/0283082 A1 * | 11/2011 | McKenney ......... | G06F 12/1018 711/202 |
| 2014/0052726 A1 * | 2/2014 | Amberg ............ | G06F 17/30412 707/737 |
| 2014/0188906 A1 * | 7/2014 | Muller .............. | G06F 17/30339 707/752 |
| 2016/0350394 A1 * | 12/2016 | Gaumnitz ......... | G06F 17/30339 |

* cited by examiner

*Primary Examiner* — Dennis Truong
(74) *Attorney, Agent, or Firm* — Sterne, Kessler, Goldstein & Fox P.L.L.C.

(57) ABSTRACT

Disclosed herein are system, method, and computer program product embodiments for database aggregation optimization. An embodiment operates by receiving data from a main memory. Within a cache, a first hash table comprising an aggregate hash of a first portion of the data is generated. A second portion of data is partitioned into one or more of partitions. Within the cache, one or more intermediate hash tables are generated. A first hash table is aggregated based on the one or more intermediate hash tables. At least a portion of the data of the final hash table is provided responsive to a query.

18 Claims, 5 Drawing Sheets

DYNAMIC HASH TABLE SIZE ESTIMATION DURING DATABASE AGGREGATION PROCESSING

CROSS-REFERENCE TO RELATED APPLICATIONS

The present application is related to U.S. patent application Ser. No. 14/726,251 filed May 29, 2015, U.S. patent application Ser. No. 13/729,111 filed Dec. 28, 2012, and U.S. patent application Ser. No. 12/978,194 filed Dec. 23, 2010, which are hereby incorporated by reference in their entireties.

BACKGROUND

Databases can be used to store many data values, however, sometimes it is helpful to have a more bird's eye view of the data that is provided through data aggregation. With data aggregation, thousands or even millions of database records can be aggregated or viewed in a summary form to provide a different view of the stored data. However, the data aggregation process often consumes a great deal of time and resources especially as the number of stored database records grow.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for database aggregation optimization. Herein, the term "optimization" generally refers to improvement of database aggregation; in some non-limiting embodiments, such improvement may approach or reach optimal performance.

Figure 1:
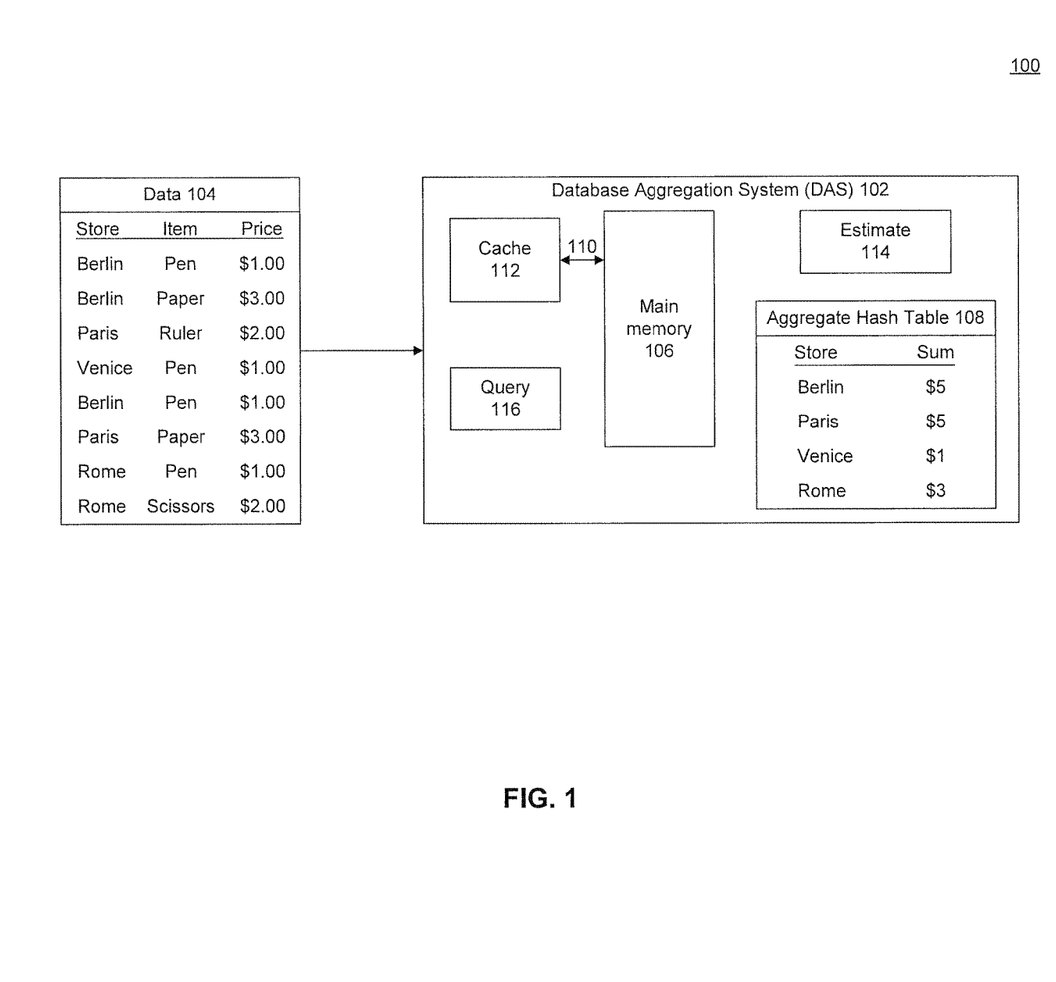
FIG. 1 is a block diagram of a database aggregation system, according to an example embodiment.

FIG. 1 is a block diagram 100 of a database aggregation system, according to an example embodiment. Database aggregation system (DAS) 102 may improve or even optimize a database aggregation process. DAS 102 may, for example, receive a query 116 on data 104 that may require an aggregation of data 104 to provide a response to query 116. As described in greater detail below, DAS 102 may generate an aggregate hash table 108 to respond to query 116.

DAS 102 may receive data 104 (e.g., as input from one or more computers or systems, which may be remotely located over a network), that may be at least partially stored in main memory 106 (across one or more computers). Aggregate hash table 108 may be a summary or aggregation of at least a portion of data 104 that is stored in main memory 106. Aggregate hash table 108 may, for example, divide data 104 into a number of different groups and provide access to statistics, data, or other data aggregation parameters pertinent to each group or group(s) and/or that are necessary to respond to one or more queries 116.

FIG. 1 shows an exemplary set of data 104 (which may be received and/or stored or organized in main memory 106), and an exemplary aggregate hash table 108 of the data aggregated into different groups. In the example of FIG. 1, the exemplary data 104 includes data about products (pen, paper, ruler, scissors) that were sold at different store locations (Berlin, Paris, Venice, and Rome) and the prices of the products that were sold.

The exemplary aggregate hash table 108 shows one embodiment of how data 104 may be grouped and aggregated. In the example shown, the data is grouped or aggregated based on the store location, and provides the sum of products or inventory sold at each location. In other examples, data 104 could have been differently grouped and aggregated into aggregate hash table 108 (based on any combination of one or more columns of data). For example, data 104 could have been grouped by the items, or could have been grouped by items and location. Or, for example, multiple aggregate hash tables 108 could be simultaneously or sequentially generated by DAS 102, each aggregate hash table 108 including different aggregations of data 104 according to different groupings. It is understood that there could be many different ways to group or aggregate data 104 for aggregate hash table 108 and that multiple aggregate hash tables 108 may be generated for the same set or different sets (or subsets) of data 104.

When processing data 104 and generating aggregate hash table 108, there are often a number of data accesses 110 (which may include data transfers) that may occur between a cache 112 and main memory 106 where data 104 is stored. However data transfers 110 are expensive in that they often require additional computing resources and time to execute (relative to data 104 already being stored in cache 112), which over the course of thousands or millions of records can add up and require additional processing power and/or processing delays. As such, in an embodiment, DAS 102 minimizes (or at least reduces) or optimizes both the number of transfers 110 between cache 112 and main memory 106 and/or the number of memory 106 accesses, while generating one or more aggregate hash tables 108 and/or responding to query 116. As used herein, it is understood that data transfer 110 (between cache 112 and main memory 106) and data access 110 (to cache 112 or main memory 106) may be used interchangeably.

Cache 112 may be a fast-access storage location relative to main memory 106 (which is slower). For example, main memory 106 may include or be a portion of random access memory (RAM) or a hard-disk used to store data 104, while cache 112 may be any storage that is faster access than main memory 106. In an embodiment, main memory 106 may be a hard disk, and cache 110 may be any memory location that has faster access than the hard disk, such as RAM. As such, main memory 106 accesses 110 may be more time consuming than cache 110 accesses 110. However, main memory 106 may include more storage than cache 112, and data 104 may not be able to be stored only in cache 112. In an embodiment, cache 112 may be volatile memory, while main memory 106 is non-volatile memory. Data modifications (i.e., additions, modifications, deletions) may occur within cache 112.

When data 104 is to be aggregated, it needs to be accessed 110 from main memory 106 and aggregated data for aggregate hash table 108 is written (110) into cache 112. If cache 112 is large enough to hold the entire aggregate or final hash table 108, then the process of data aggregation completes without extra data transfers 110 between cache 112 and main memory 106. However, extra data transfers 110 may be needed when the size of aggregate hash table 108 exceeds the size of cache 112. Because in such a case, the data of aggregate hash table 108 may need to be repeatedly transferred 110 back and forth between main memory 106 and cache 112 as the portion of the aggregate hash table 108 is needed, this process can become computationally expensive. DAS 102 optimizes or minimizes these extra data transfers 110 that may occur when the size of aggregate hash table 108 exceeds the size of cache 112.

For example, if the cache 112 of FIG. 1 could hold four or more data records, then the entire aggregate hash table 108 may be written to cache 112 without extra data transfers 110. However, if cache 112 can only hold three or fewer data records, then the aggregation of data 104 may require additional data transfers 110 to modify, build, or otherwise generate aggregate hash table 108.

Aggregate hash table 108 may be stored in cache 112 when being generated or when data 104 from main memory 106 is being aggregated. However, as noted above, cache 112 may be smaller than main memory 106, and it may be that aggregate hash table 108 may grow to exceed the size of cache 112. When this happens, at least a portion of aggregate hash table 108 may need to be transferred 110 to main memory 106 for storage. However if the transferred portion is needed again, it must be transferred 110 back to cache 112 to be updated (based on data aggregation), and a different portion of aggregate hash table 108 must be transferred into main memory. As such, continuing to aggregate the remaining data 104 from memory into aggregate hash table 108 could become very costly (e.g., requiring additional time and/or resources) very quickly, at least in part because of multiple, repeated, or otherwise additional data transfers 110.

Figure 2:
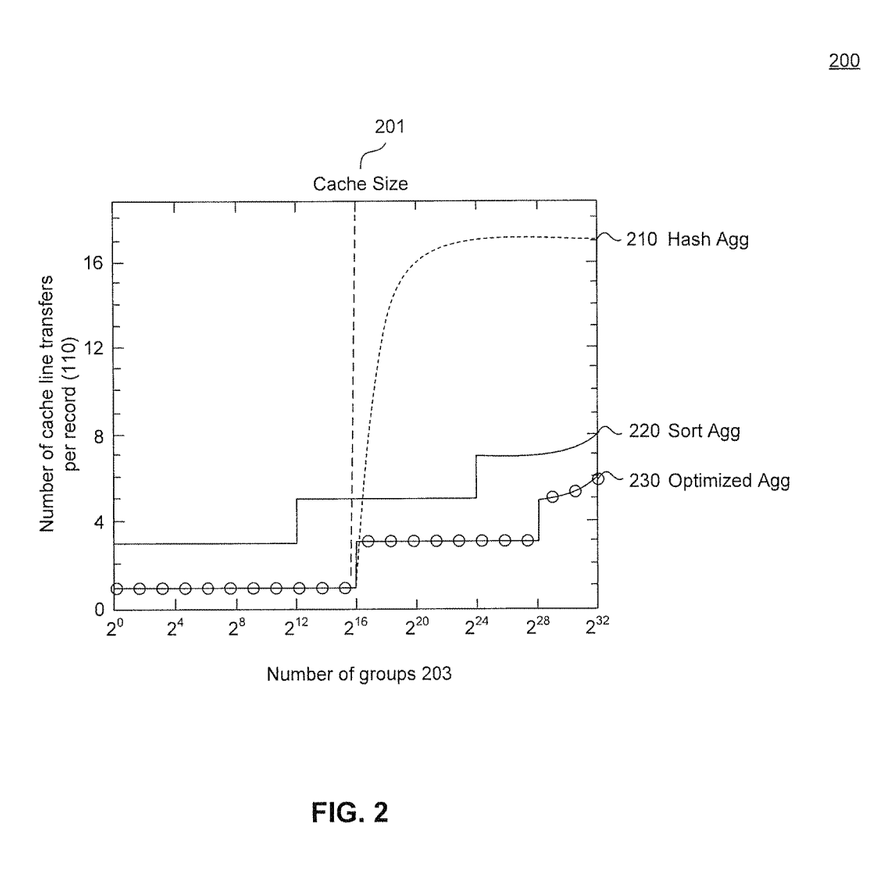
FIG. 2 is an illustration of an example performance of different database aggregation processes, according to an example embodiment.

FIG. 2 is an illustration 200 of an example performance of different database aggregation processes, according to an example embodiment. FIG. 2 shows an example of how the number of data transfers 110 (also known as cache line transfers) increases once the size of the aggregate hash table 108 exceeds the cache size 201. In the example show, the number of cache line transfers is shown on a per record basis on the Y-axis.

Cache size 201 is the size of cache 112. For example, cache size 201 may be the number of records that may be stored in cache 112. The X-axis shows the number of groups 203 into which data 104 may be aggregated. For example, as noted above, in the exemplary data of FIG. 1, there are four groups 203 which are based on the store locations. The data provided in FIG. 2 illustrates another embodiment of exemplary data, and may vary in different implementations based on cache size 201 and number of groups 203.

The performance of the hash aggregation discussed above is shown by line 210 of FIG. 2. As shown, once the size of the aggregate hash table 108 exceeds the cache size 201 of cache 112, there is a significant increase in the number of data transfers 110 required to complete the aggregate hash table 108 and a steep degradation in performance.

One alternative that may be used to overcome the disadvantages of hash aggregation 210 (particular with regard to data transfers 110 performed beyond cache size 201), is a sort aggregation 220. In sort aggregation 220, data in main memory 106 may first be sorted into different groups. Then, on a second pass through the sorted data of main memory 106, the sorted data may be aggregated into aggregate hash table 108. This would minimize the number of aggregate hash table data transfers 110 between cache 112 and main memory 106. While sort aggregation 220 may be more efficient for larger aggregate hash tables 108 (e.g., where the number of groups 203 exceed the cache size 201), there is an additional overhead that is incurred on smaller aggregate hash tables 108.

DAS 102 performs the optimized aggregation processing shown as line 230. DAS 102 uses a hybrid approach that reduces the inefficiencies that result from using either hash aggregation 210 or sort aggregation 220 that maximizes performance. The details of how optimized aggregation 230 is performed is provided in greater detail below.

Figure 3:
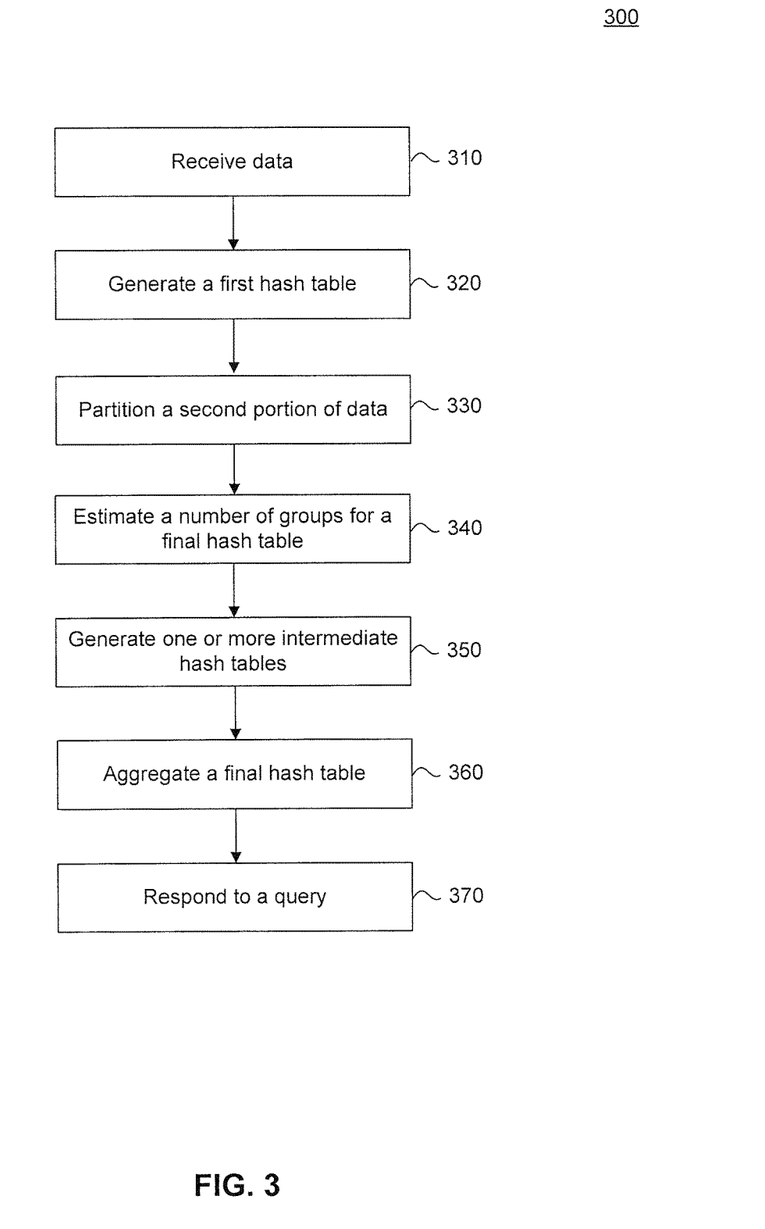
FIG. 3 is a flowchart illustrating a process for database aggregation, according to an example embodiment.

FIG. 3 is a flowchart illustrating a process for database aggregation, according to an example embodiment. Method 300 can be performed by processing logic that can comprise hardware (e.g., circuitry, dedicated logic, programmable logic, microcode, etc.), software (e.g., instructions executing on a processing device), or a combination thereof. As referenced above, method 300 may be an illustration of how optimized aggregation (230) is performed by DAS 102.

In step 310, data is received. For example, DAS 102 may receive data 104 from one or more systems or computers, including over a network. Data 104 may be received, and stored in main memory 106. Main memory 106 may include a database, table, or other memory, and data 104 may be stored across one or more computing devices or processors.

In step 320, a first hash table is generated. For example, DAS 102 may perform a first data aggregation of a first portion of data 104. In an embodiment, DAS 102 may use the hash aggregation function 210 to generate the first hash table. If DAS 102 is able to aggregate all of the data 104 into aggregated hash table 108 (because aggregate hash table 108 fits within cache 112), the process completes. However, if aggregate hash table 108 grows to a size that is unable to fit entirely within cache 112 (i.e., cache size 201, when the number of groups or records 203 of aggregate hash table 108 exceed the maximum number of records 201 that can be stored in cache 112) on a first pass through data 104, then the processing continues to step 330.

In step 330, the second portion of data may be partitioned. As described above, a first portion of data may have been aggregated and stored in a first aggregate hash table 108. If all of the data 104 was not processed (e.g., because the size of the first aggregate hash table 108 exceeded the available cache space 201), this may leave a second portion of data in main memory 106 that has yet to be processed or aggregated for aggregate hash table 108. This second portion may be partitioned such that each partition can be processed and be aggregated into another intermediate hash table 108 that fits within the available cache 112 space. This process may repeat or continue for additional portions of data 104 until all the data 104 of main memory 106 required to be aggregated (to respond to query 116) is processed.

In an embodiment, prior to or corresponding with the partitioning of the second portion of data 104 from main memory, DAS 102 may sort or at least partially sort the second portion of data 104 (or all or substantially all of the remaining data 104) into groups for aggregation into one or more aggregate hash tables 108. In the exemplary data shown in FIG. 1, this sort may include sorting data 104 by city, or may include an alphanumeric sort of data 104.

In an embodiment, if cache 112 may be able to hold 2 records/groups of aggregate hash table 108, then data 104 may be partially sorted or partitioned such that all the Berlin and Paris records are sorted in a first partition while the Rome and Venice records are sorted into a second partition. Or, for example, the data 104 may be sorted and then partitioned based the cache size 201.

Sorting the records may allow for faster aggregation into one or more intermediate aggregate hash tables 108. In an embodiment, a first aggregate hash table 108 may be generated for the first partition (including records for Berlin and Paris), and a second intermediate aggregate hash table 108 may be generated for the second partition (including records for Rome and Venice). In an embodiment, the first and second intermediate hash tables 108 may either be generated sequentially or in parallel by multiple processors.

In step 340, a number of groups for a final hash table is estimated. For example, using a cardinality estimator, DAS 102 may compute estimate 114. In an embodiment, estimate 114 may be computed in concurrence with the processing of data 104 (e.g., during the generation of the first hash table (step 320), data partitioning and/or data sorting (step 330). By computing estimate 114 simultaneously or concurrently with data processing, DAS 102 avoids extra accesses 110 to main memory 106 that would otherwise be necessary if the tasks or steps were performed independently or separately of another other (including at different times). In an embodiment, DAS 102 may include one or more processors or threads configured to act as estimators to process data 104, make notes, and compute estimate 114.

A processor may be specially adapted to perform this simultaneous or same-data-access processing. Conventional systems do not perform estimation before creating a final hash table, which requires repeated resizes of the final hash table in a conventional system. Each resize is computationally very expensive in terms of resources and time required. Further, conventional systems do not perform both data processing and hash table size estimation in the manner being performed by DAS 102 and as described herein, nor do conventional systems use a single data transfer or access 110 (which may include multiple data records) to perform both processing and estimation.

For example, as noted above, when data 104 is accessed 110 from main memory for generating the first hash table (320) or sorting (330), a first processor or thread may use the accessed data 104 to perform the processing function. While this data 104 is accessed, and before accessing the next portion of data 104 from main memory 106 for processing, a second process or thread (or the first thread upon completion of the aggregation function) may use the accessed data 104 to compute estimate 114 (based on a cardinality function). This process may continue until a particular number of records or amount of data 104 has been processed, or until aggregate hash table 108 has used the available cache memory 112 (e.g. when the group size 203 has equaled or exceeded the cache size 201).

The processing and estimation processes performed by DAS 102 enable resource and time savings in maximizing the use of and minimizing the number of data accesses 110 necessary to accurately estimate and generate aggregate hash table. DAS 102 may further, reduce or eliminate the need for repeated data transfers 110 of portions of aggregate hash table 108 between cache 112 and main memory 106.

In step 350, one or more intermediate hash tables are generated. For example, as noted above with respect to step 320, an intermediate hash table 108 may be generated for each partition of the second portion of data. These intermediate hash tables may be generated sequentially or in parallel by different processors or threads.

In an embodiment, an estimator may take notes or create a temporary set of data that is used to generate an estimate 114 of how many groups will formed from the processed data 104. These notes from different estimators may be combined to generate a final estimate 114 for the final hash table 108. This final estimate may then be used to estimate the number of records in and generate the final hash table size.

In step 350, a final hash table may be aggregated. For example, aggregate hash table 108 may be generated based on the final estimate(s) 114 from one or more estimators. This generation may include an allocation of memory or storage space large enough to hold the estimated number of records or groups 114. In an embodiment, the first intermediate hash table (generated in step 320) may be resized based on estimate 114. Or, for example, a new hash table may be created (with enough space for the estimated number of groups/records 114, wherein each group may correspond to a record in the hash table). Then, the data from one or more intermediate hash tables may be copied into the final hash table 108 during a second pass over the data. Once their data is copied or moved into the final hash table, the intermediate hash tables may be discarded or the memory space otherwise made available again.

Figure 4:
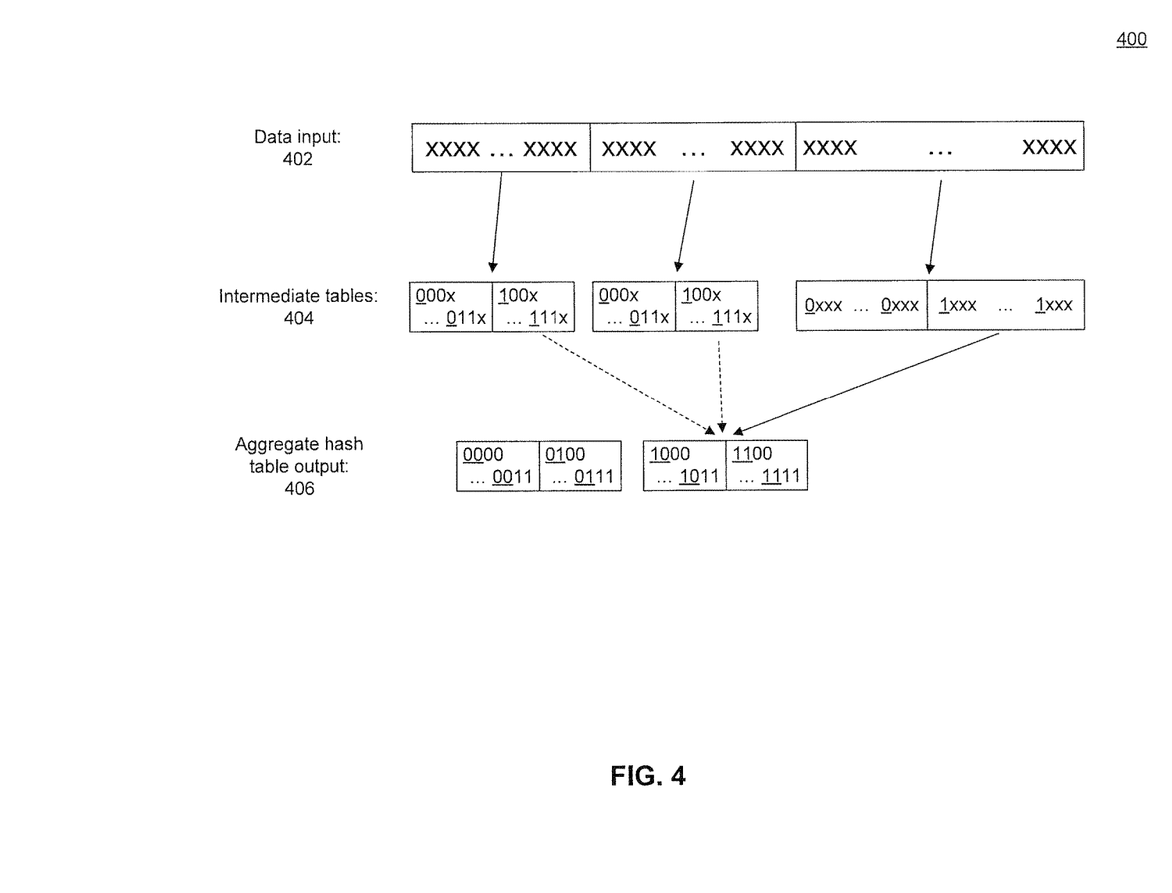
FIG. 4 illustrates an example process for database aggregation, according to an embodiment.

FIG. 4 illustrates an example process for database aggregation, according to an embodiment. FIG. 4 illustrates an example in which multiple intermediate hash tables are created prior to generating a final hash table, according to an embodiment. In the example, data input 402 may be the second portion of data 104 or remaining data 104 in main memory 106 after the generation of a first intermediate hash table. Data input 402 may be sorted (as described above) and partitioned (as shown by the line breaks).

One or more processors may then aggregate the partitioned data input 402 into intermediate tables 404 (as described in step 360 above). The intermediate tables 404 may include intermediate hash tables or the partitions of data input 402.

The intermediate tables 404 may then be assembled into one or more final or aggregate hash tables or output 406. In an embodiment, as shown, any data input 402, intermediate tables 404, or aggregate hash table output 406 may be across multiple processors or memory locations even if from the same or related group of data input 402.

In an embodiment, estimate 114 may be too small and more space may be required in aggregate hash table 108 to store the actual number of groups of data 104. As such, the final aggregate hash table 108 may need to be resized to provide enough space for the additional or unaccounted for groups. There are different ways aggregate hash table 108 may be resized. In an embodiment, aggregate hash table 108 may be increased by a particular percentage or size of existing data (e.g., the size may be increased by 50% or doubled, or increased by another portion). In another embodiment, a second estimate may be computed during generation of the second intermediate hash table or partitioning of data, which may be used to determine how big to make the aggregate hash table. For example, the notes from a first estimator (used to determine estimate 114 corresponding a first intermediate hash table) and notes from a second estimator (used to determine estimate 114 corresponding a second intermediate hash table) may be combined to determine a final estimate for the entire table. As noted above, various estimates 114, generated by the various processors, may then be combined to get a final estimate 114 for a final aggregate hash table 108.

Referring back to FIG. 3, in step 360, a portion of aggregate hash table may be provided responsive to a query. For example, DAS 108 may receive query 116 on data 104. In an embodiment, data 104 may be aggregated in order to respond to query 116. For example, query 116 may request the total sum of goods sold in one or more of the store locations. As such, DAS 102 may aggregate data 104 in the manner described herein and provide a response to query 116.

Figure 5:
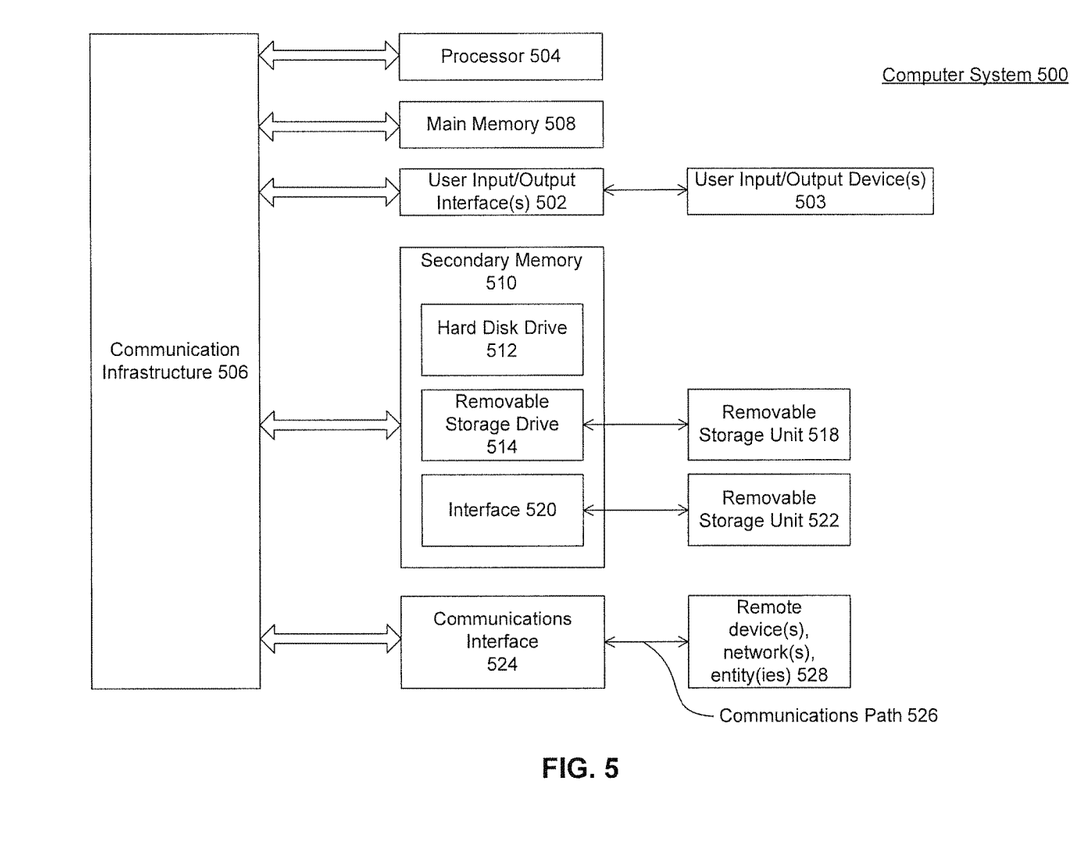
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
receiving data from a main memory, wherein the data is to be hashed into a final hash table comprising a number of groups;
generating, within a cache, a first hash table comprising an aggregate hash of a first portion of the data, wherein a second portion of the data is not aggregated into the first hash table;
partitioning the second portion of data into one or more of partitions, wherein the partitioning comprises determining, by an estimator, an estimate of the number of groups of the final hash table based on the second portion of data;
generating, within the cache, one or more intermediate hash tables each comprising an aggregate hash of a partition of the second portion of data, wherein a count of how many intermediate hash tables are generated is based at least in part on a size of the cache;
aggregating the first hash table and the one or more intermediate hash tables into the final hash table, wherein prior to the aggregating, the final hash table is allocated storage size based on the estimate of the number of groups for the second portion of data and a number of groups for the first portion of data; and
providing, responsive to a query, at least a portion of data of the final hash table to a computing device;
wherein at least one of the receiving, generating the first hash table, partitioning, generating the one or more intermediate hash tables, aggregating, and providing are performed by one or more processors.

2. The method of claim 1, wherein the generating the first hash table comprises:
determining, by the estimator, notes about the first portion of data, wherein the notes may be used by the estimator in determining the estimate of the number of groups of the final hash table.

3. The method of claim 1, wherein the generating the final hash table comprises:
copying data from the first hash table into the final hash table; and
discarding the first hash table.

4. The method of claim 1, wherein the partitioning comprises:
determining that the first hash table filled an available portion of the cache; and
sorting the second portion of data; and
partitioning the second portion of data based on a size of the cache.

5. The method of claim 1, further comprising:
determining that a total number of groups for the first and second portions of data exceeds the estimate of the number of groups; and
increasing a size of the final hash table to accommodate the total number of groups.

6. The method of claim 1, wherein the generating first hash table and the one or more intermediate hash tables is performed during a first pass over the data, and wherein the aggregating into the final hash table is performed during a second pass over the data.

7. The method of claim 1, wherein the partitioning comprises:
partitioning the second portion of data into the plurality of partitions, wherein each partition is small enough to fit within the cache.

8. The method of claim 1, further comprising:
combining the final hash table produced by a first processor with one or more of the intermediate hash tables produced by one or more other processors.

9. The method of claim 1, wherein the determining, by the estimator, comprises:
performing a cardinality estimate associated with the second portion of the data concurrently with the generating the first hash table.

10. A system, comprising:
a memory; and
at least one processor coupled to the memory and configured to:
receive data from a main memory, wherein the data is to be hashed into a final hash table comprising
generate, within a cache, a first hash table comprising an aggregate hash of a first portion of the data, wherein a second portion of the data is not aggregated into the first hash table;
partition the second portion of data into one or more of partitions, wherein the partitioning comprises determining, by an estimator, an estimate of the number of groups of the final hash table based on the second portion of data;
generate, within the cache, one or more intermediate hash tables each comprising an aggregate hash of a partition of the second portion of data, wherein a count of how many intermediate hash tables are generated is based at least in part on a size of the cache;
aggregate the first hash table and the one or more intermediate hash tables into the final hash table, wherein prior to the aggregating, the final hash table is allocated storage size based on the estimate of the number of groups for the second portion of data and a number of groups for the first portion of data; and
provide, responsive to a query, at least a portion of data of the final hash table to a computing device.

11. The system of claim 10, wherein the generating the first hash table comprises:
determining, by the estimator, notes about the first portion of data, wherein the notes may be used by the estimator in determining the estimate of the number of groups of the final hash table.

12. The system of claim 10, wherein to generate the final hash table the at least one processor configured is configured to:
copy data from the first hash table into the final hash table; and
discard the first hash table.

13. The system of claim 10, wherein to partition the at least one processor configured is configured to:
sort the second portion of data;

partitioning the second portion of data based on a size of the cache.

14. The system of claim 10, wherein the at least one processor is further configured to:
   determine that a total number of groups for the first and second portions of data exceeds the estimated number of groups; and
   increase a size of the final hash table to accommodate the total number of groups.

15. The system of claim 10, wherein to generate the first hash table the at least one processor configured is configured to pass over the data a first time, and to aggregate the data into the final hash table the at least one processor is configured to pass over the data a second time.

16. The system of claim 10, wherein to partition the at least one processor configured is configured to:
   partition the second portion of data into the plurality of partitions, wherein each partition is small enough to fit within the cache.

17. The system of claim 10, wherein the at least one processor is further configured to:
   combine the final hash table produced by a first processor with a second hash table produced by a second processor.

18. A tangible computer-readable device having instructions stored thereon that, when executed by at least one computing device, causes the at least one computing device to perform operations comprising:
   receiving data from a main memory, wherein the data is to be hashed into a final hash table comprising a number of groups;
   generating, within a cache, a first hash table comprising an aggregate hash of a first portion of the data, wherein a second portion of the data is not aggregated into the first hash table;
   partitioning the second portion of data into one or more of partitions, wherein the partitioning comprises determining, by an estimator, an estimate of the number of groups of the final hash table based on the second portion of data;
   generating, within the cache, one or more intermediate hash tables each comprising an aggregate hash of a partition of the second portion of data, wherein a count of how many intermediate hash tables are generated is based at least in part on a size of the cache;
   aggregating the first hash table and the one or more intermediate hash tables into the final hash table, wherein prior to the aggregating, the final hash table is allocated storage size based on the estimate of the number of groups for the second portion of data and a number of groups for the first portion of data; and
   providing, responsive to a query, at least a portion of data of the final hash table to a computing device.

* * * * *